United States Patent
Huang

(10) Patent No.: US 7,496,749 B2
(45) Date of Patent: Feb. 24, 2009

(54) METHOD AND APPARATUS FOR DECRYPTING ENCRYPTED DATA TRANSMITTED WIRELESSLY BY UPDATING A KEY-TABLE

(75) Inventor: Jia-Bin Huang, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 871 days.

(21) Appl. No.: 10/708,759

(22) Filed: Mar. 24, 2004

(65) Prior Publication Data

US 2005/0216735 A1    Sep. 29, 2005

(51) Int. Cl.
*H04L 9/00*    (2006.01)
(52) U.S. Cl. .................. 713/150; 380/277; 713/171
(58) Field of Classification Search .................. 713/171, 713/150; 380/277
See application file for complete search history.

(56) References Cited

U.S. PATENT DOCUMENTS 4,607,137 A * 8/1986 Jansen et al. ................. 380/277
6,973,071 B1 * 12/2005 Bourk ........................ 370/349
2003/0105717 A1 * 6/2003 Kim et al. .................... 705/50
2005/0154871 A1 * 7/2005 Lin et al. ..................... 713/150

* cited by examiner

*Primary Examiner*—Christopher J Brown
(74) *Attorney, Agent, or Firm*—Winston Hsu

(57) ABSTRACT

A method and an apparatus for decrypting encrypted data transmitted wirelessly by updating a key-table comprises a receiver in wireless communication with a sender. The method includes receiving an encrypted data from the sender; searching a key-table of the receiver for a decryption key corresponding to the encrypted data; if the decryption key is not stored in the key-table, driving the receiver for searching a master list of the receiver for the decryption key and transferring the decryption key from the master list to the key-table to update the key-table; and decrypting the encrypted data through utilizing the decryption key stored in the key-table. The method also includes the option of disabling the sending of an acknowledgement message from the receiver to the sender after having received data from the sender.

21 Claims, 2 Drawing Sheets

METHOD AND APPARATUS FOR DECRYPTING ENCRYPTED DATA TRANSMITTED WIRELESSLY BY UPDATING A KEY-TABLE

BACKGROUND OF INVENTION

1. Field of the Invention

The invention relates to a wireless communication system, and more particularly, to a method and an apparatus for the decryption of encrypted data transmitted in a wireless communication system.

2. Description of the Prior Art

An increasingly popular networking solution in today's world is wireless networking. Instead of using wires to transmit data, wireless networking uses a signal to transmit data. Without wires, users are no longer restricted to locations where only wires are available.

However, wireless networking is not without its disadvantages. The major issue with wireless networking concerns the security of the information transmitted. As a result, many of the protocols of wireless networking such as IEEE 802.11 employ some form of encryption to protect the private information from being easily intercepted. Some encryption schemes such as Wired Equivalent Privacy (WEP) are one key schemes, meaning that all wireless devices on the network encrypt their information using one shared key. Also, because all devices use the same key to encrypt data, all the devices can use the encryption key as a decryption key for incoming data. As one can imagine such a scheme only offers modest protection.

Other encryption schemes such as Wife Protected Access (WPA) or IEEE 802.11i are individual key schemes, meaning that each device on the network has its own individual key to encrypt data. Giving each device on the wireless network its own individual key does make security more robust in comparison to schemes such as WEP. When wireless communication is established between the access point and a wireless device, both of the wireless device and the access point store a ciphering key specific to the wireless device. Suppose that N wireless devices are in wireless communication with the access point. The access point keeps N different keys corresponding to these N wireless devices. When a wireless device wants to deliver data to a target host connected to the wired network, the wireless device, based on the above-mentioned ciphering scheme, has to encrypt the data with its own key. The access point receives the encrypted data, and retrieves the stored key corresponding to the wireless device for correctly decrypting the encrypted data. In the end, the access point converts the decrypted data into proper packets defined by the transmission standard of the wired network, and outputs the packets to the target host through the wired network.

It is clear that there is a great cost of using individual keys to perform the better ciphering scheme. That is, in order to decrypt incoming data from wireless devices (senders) on the wireless network, an access point (receiver) on the wireless network must store the keys specific to the wireless devices as decryption keys. This has an impact on the design of access points made to be compatible with encryption schemes employing individual keys.

Generally, the memory for storing keys (key-table memory) of an access point is required to have a fast access speed so as to not slow down the decryption and transmission of data. Such types of memory that fit this requirement are quite expensive, and as a result, the key-table memory of the wireless device is small, being only large enough to store a few keys. Problems arise when the wireless network has more devices and therefore keys than the number of keys that the key-table of a wireless device can store.

An obvious solution employed is to store a master list of the keys in the system memory of the wireless device. When a decryption key cannot be found in the key-table, a processor of the access point searches the master list stored in the system memory. The processor then uses a software driver to decrypt the received data through the wanted key found in the master list. This is also an unattractive solution because of the software decryption aspect. Software decryption not only slows data transmission and increases the size and complexity of the software driver, but it is also very taxing on the system resources of the access point, all of which leads to a decrease in system performance.

SUMMARY OF INVENTION

It is therefore one of the many objectives of the claimed invention to provide a method for decrypting encrypted data transmitted wirelessly by updating a key-table to solve the above-mentioned problem. According to the claimed invention, a method for decrypting data received by a receiver is disclosed. The method comprises searching a key-table of the receiver for a decryption key corresponding to the encrypted data; if the decryption key is not stored in the key-table, driving the receiver for disabling an acknowledgement message that informs the sender that the encrypted data has been received, transferring the decryption key from the master list to the key-table to update the key-table; and decrypting the encrypted data through utilizing the decryption key stored in the key-table.

One of the many advantages of the claimed invention is that the use of software decryption can be avoided in the event that the sought-after decryption key does not exist.

DETAILED DESCRIPTION

Figure 1:
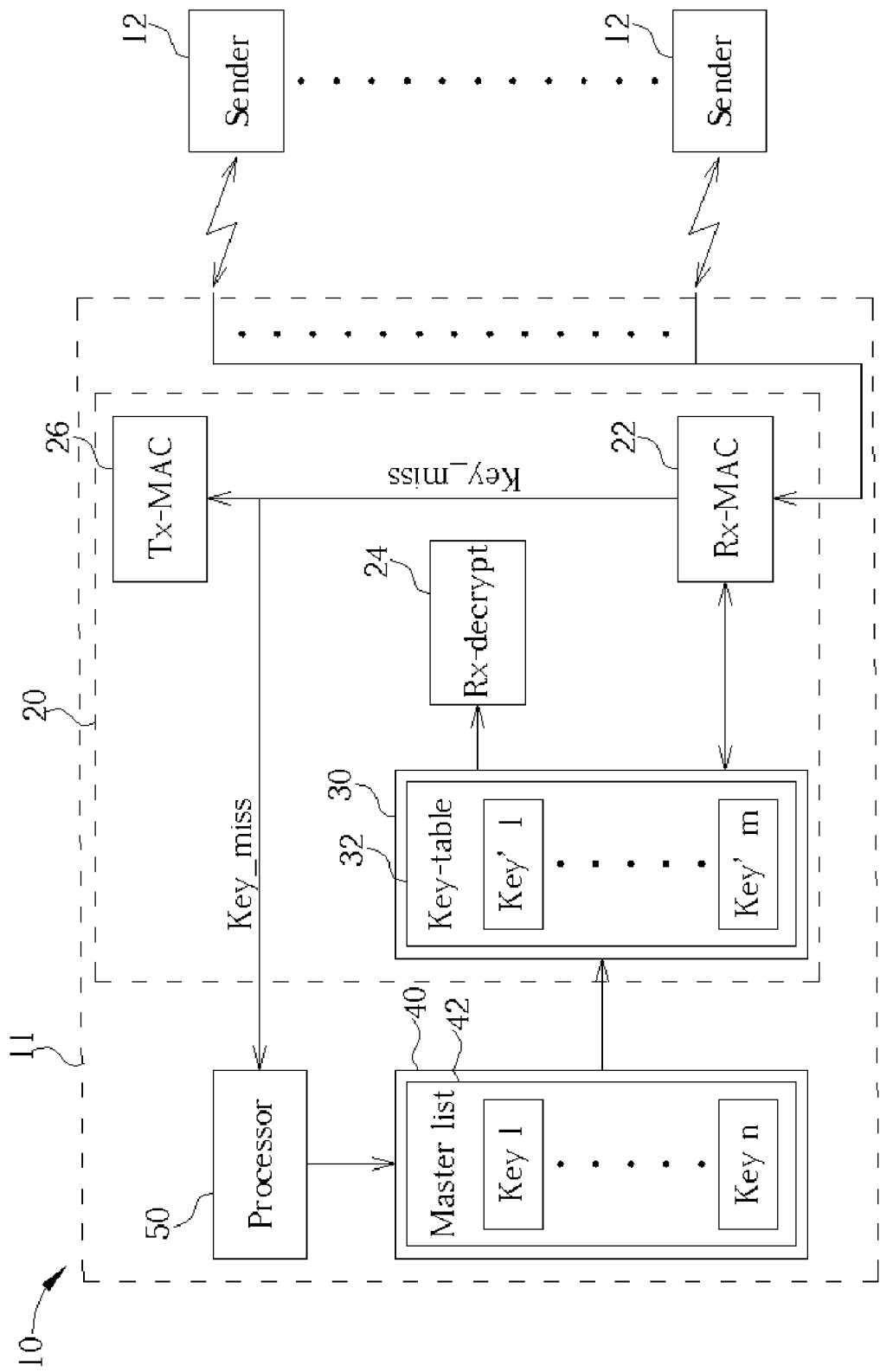
FIG. 1 is a block diagram of a wireless communication system according to the present invention.

Please refer to FIG. 1. FIG. 1 is a block diagram of a wireless communication system 10 according to the present invention. In the wireless communication system 10, a wireless receiver 11 is in wireless communication with a plurality of wireless senders 12. Please note that the wireless receiver 11 can be any device (ex. a wireless network card inserted in a computer) supporting ciphering functionality. Taking a wireless LAN (WLAN) system for example, the wireless receiver 11 can be a router or a bridge for arbitrating data transmission between the wireless sender 12 and a target host of a wired network or a wireless network. In the preferred embodiment, the wireless receiver 11 is designed to function as an access point used in the WLAN system. Therefore, the wireless senders 12 correspond to mobile units with wireless network interface cards. The wireless receiver 11 comprises a controller 20, a storage device 40, and a processor 50. The controller 20 is for receiving, transmitting, and if necessary encrypting/decrypting data and comprises a storage device 30, which has quick data access operation and is used for storing a key-table 32. The storage device 40 is used for storing a master list 42. As described before, the wireless receiver 11 functioning as the access point will hold different keys corresponding to the wireless devices (the wireless senders 12) handled by the same access point. These keys $KEY_1$-$KEY_n$ are decryption keys used by the wireless receiver 11 to decrypt encrypted data received from the wireless senders 12 and are listed in the master list 42. In addition, a plurality of keys $KEY'_1$-$KEY'_m$ (m<n) are chosen from the keys $KEY_1$-$KEY_n$ listed in the master list 42 and are listed in the key-table 32. For example, the storage device 40 is a dynamic random access memory (DRAM), and the storage device 30 is a static random access memory (SRAM). Therefore, the wireless receiver 11 is capable of efficiently decrypting the incoming data with the help of the SRAM caching the wanted decryption keys. It is obvious that the storage devices 30, 40 are not limited to the above-mentioned memory types.

The processor 50 is for controlling operations of the wireless receiver 11 and updating the decryption keys $KEY'_1$-$KEY'_m$ in the storage device 30. In addition to the storage unit 30, the controller 20 further comprises an RX-MAC 22 for receiving data, searching the storage device 30, and reporting the results of its searches, an RX-Decrypt 24 for decrypting encrypted data via hardware using a decryption key stored in the storage device 30, and a TX-MAC 26 for transmitting outgoing signals.

Figure 2:
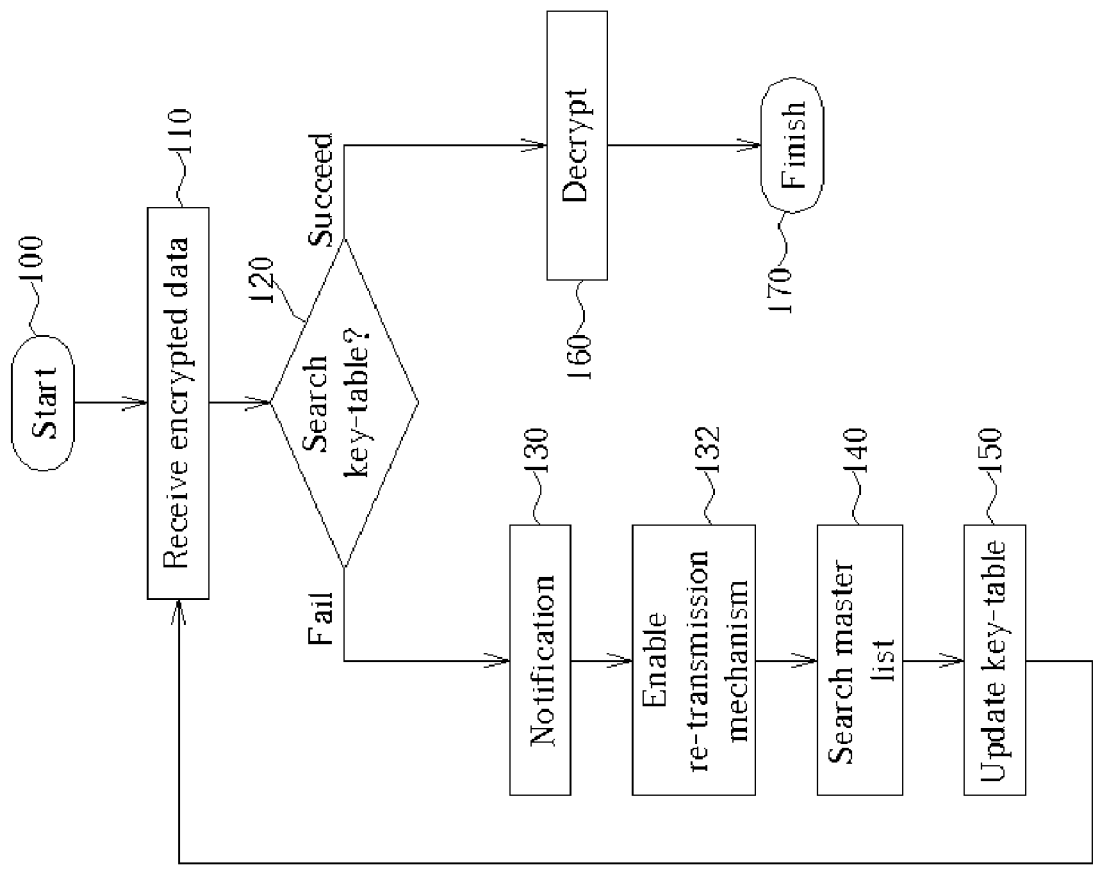
FIG. 2 is a flowchart of a method employed by a wireless receiver shown in FIG. 1

Please refer to FIG. 2. FIG. 2 is a flowchart of a method employed by the wireless receiver 11 shown in FIG. 1. The method of decrypting incoming data according to the present invention includes following steps:

Step 100: Start.

Step 110: Receive Encrypted Data. The controller 20 of the wireless receiver 11 receives encrypted data from a wireless sender 12.

Step 120: Search Key-Table. Based on the information from the wireless sender 12, the wireless receiver 11 searches the key-table 32 for the corresponding decryption key. If the search is successful, go to Step 160; otherwise, go to Step 130.

In this embodiment, the RX-MAC 22 of the controller 20 searches the key-table 32 by using the MAC address of the wireless sender 12 to conduct the search.

Step 130: Notification. An unsuccessful search for the corresponding decryption key means that the wireless receiver 11 cannot at this time use hardware to decrypt encrypted data from the wireless sender 12. As a result, wireless receiver 11 needs to be notified so that the corresponding decryption key can be placed into the key-table 32.

In this embodiment, when the search yields an unsuccessful result, the RX-MAC 22 issues a system interrupt KEY_MISS to the processor 50.

Step 132: Enabling a re-transmission mechanism in the sender.

In this embodiment, the receiver 11 disables an acknowledgement mechanism (No-ACK). It is well known that an acknowledgement mechanism is widely utilized to make sure that the peer receiver has received the incoming data successfully. If the wireless receiver 11 is uses a wireless protocol that requires the acknowledgement of received data, the KEY_MISS signal will also be sent to the TX-MAC 26, which thereby disables the wireless receiver 11 from outputting an acknowledgement message to the wireless sender 12. As stated before, disabling the acknowledgement is only applicable for when the wireless receiver is following a protocol that requires the acknowledgement of received data. Therefore, this step of disabling the acknowledgement mechanism should not be taken as a limitation of the claimed invention.

Step 140: Search Master list. Upon being properly notified, the wireless receiver 11 searches the master list 42 for the corresponding decryption key that matches the wireless sender 12.

In this embodiment, the processor 50, after having received the system interrupt KEY_MISS from the RX-MAC 22, is used to search the master list.

Step 150: Update Key-table. Upon finding the corresponding decryption key in the master list 42, the key-table 32 is updated. By updating the key-table 32, the wireless receiver 11 will then be able to use hardware to decrypt encrypted data from the wireless sender 12.

In this embodiment, the processor 50 is used to transfer the corresponding decryption key (ex. a copy of the wanted decryption key is transferred or the decryption key itself is transferred) from the master list 42 into the key-table 32. In a preferred embodiment, the least-frequently-used decryption key in the key-table 32 will be replaced with the decryption key sought from the master list 42.

Step 160: Decrypt. The search for the corresponding decryption key in the key-table 32 is successful, meaning that the wireless receiver 11 is able to use hardware to decrypt the received encrypted data.

In this embodiment, after the decryption key has been found within the key-table 32, the RX-Decrypt 24 of the controller 20 obtains the decryption key from the key-table 32 and performs hardware decryption of the received encrypted data.

Step 170: Finish.

In Step 120, the RX-MAC 22 searches the key-table 32 for a decryption key corresponding to the MAC address of the wireless receiver 11. If the search is successful, then the wireless receiver 11 can proceed to step 160 to carry out hardware decryption of the received encrypted data by having the RX-Decrypt 24 adopting the corresponding decryption key from the key-table 32. However, if the search is unsuccessful, then the RX-MAC 22 proceeds to step 130 and issues a signal to notify the processor 50 of the result. In this embodiment, the signal that serves as a system interrupt is a KEY_MISS. If the wireless receiver 11 is following a wireless protocol that requires the wireless receiver 11 to send an acknowledgement message to the wireless sender each time incoming data is successfully received, such as in this embodiment, then Step 132 will also be performed. In Step 132, the RX-MAC 22 will also send the KEY_MISS to the TX-MAC 26 to notify the TX-MAC 26 that the search was unsuccessful so that the acknowledgement message usually sent after receiving incoming data is disabled. Because the wireless sender 12 does not receive the acknowledge message from the wireless receiver 11 after a period of time, the wireless sender 12 deems that the previously sent data was lost during the wireless transmission, and will retransmit the same data previously sent to the wireless receiver 11. As mentioned above, the wireless receiver 11 is unable to decrypt the received data for lack of the required decryption key, and the wireless sender 12 will retransmit the previously sent data. Therefore, the wireless receiver 11 will discard the received encrypted data if the required decryption key is not currently stored in the key-table 32.

Having sent notification, in step 140, the processor 50 will search the master list 42 for the corresponding decryption key. After the decryption key is found, in step 150, the processor 50 updates the key-table 32 by transferring the corresponding decryption key from the master list 42 into the key-table 32. For instance, a copy of the wanted decryption key is stored into the key-table 32. In the preferred embodiment, the sought decryption key from the master list 42 will replace the least-frequently-used decryption key in the key-table 32.

As mentioned above, the wireless sender 12 retransmits the same data previously sent to the wireless receiver 11 because of the missing acknowledge message. Afterwards, the wireless receiver 11 returns to step 110 and starts receive the same encrypted data retransmitted from the wireless sender 12. This time, in Step 120, the corresponding decryption key will be found successfully, and the RX-Decrypt 24 can perform hardware decryption of the encrypted data.

As one can see, one of the benefits of the claimed invention is the ability to retain hardware decryption ability and avoid software decryption in the case that the corresponding decryption key is not found in the key table.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for decrypting data received by a receiver, the receiver being in communication with a sender, comprising:
    receiving the encrypted data from the sender;
    searching a key-table of the receiver for a decryption key corresponding to the encrypted data;
    updating the key-table with the decryption key corresponding to the encrypted data from a master key-table and enabling a re-transmission mechanism of the sender when the decryption key is not stored in the key-table and the encrypted data is received successfully; and
    decrypting the encrypted data through utilizing the updated decryption key stored in the key-table.

2. The method of claim 1 further comprising using a Media Access Control (MAC) Address of the sender to search the key-table for the decryption key.

3. The method of claim 1 further comprising triggering a system interrupt to notify a controller of the receiver if the decryption key is not stored in the key-table.

4. The method of claim 3 wherein the controller searches a master list for the decryption key and transfers the decryption key to the key-table when receiving the system interrupt.

5. The method of claim 1 further comprising replacing a least frequently used decryption key in the key-list with the decryption key transferred in.

6. The method of claim 1 further comprising discarding the encrypted data when the decryption key is not stored in the key-table.

7. The method of claim 1 wherein the step of enabling a re-transmission mechanism comprises disabling the receiver from outputting an acknowledgement message to the sender to inform the sender of reception of the encrypted data.

8. The method of claim 1 being applied to a wireless LAN (WLAN) system.

9. The method of claim 1 wherein the receiver is a wireless network card inserted in a computer.

10. A method for decrypting data received by a receiver, the receiver being in communication with a sender, comprising:
    receiving an encrypted data from the sender;
    disabling an acknowledgement message which informs the sender of reception of the encrypted data and updating the key-table with the decryption key corresponding to the encrypted data from a master key-table when a decryption key is not stored in a key-table and the encrypted data is received successfully, wherein the decryption key corresponds to the encrypted data;
    receiving an re-transmitted encrypted data from the sender; and
    decrypting the encrypted data re-transmitted from the sender utilizing the updated decryption key stored in the key-table.

11. The method of claim 10 further comprising using a Media Access Control (MAC) Address of the sender to search the key-table for the decryption key.

12. The method of claim 10 further comprising replacing a least frequently used decryption key in the key-list with the decryption key transferred in.

13. The method of claim 10 being applied to a wireless LAN (WLAN) system.

14. The method of claim 10 further comprising discarding the encrypted data when the decryption key is not stored in the key-table.

15. The method of claim 10 wherein the sender re-transmits the encrypted data if the sender does not receive the acknowledgement message, and the receiver decrypts the encrypted data re-transmitted from the sender.

16. An apparatus for decrypting data received by a receiver, the receiver being in communication with a sender, comprising:
    a key-table for storing a plurality of decryption keys; and
    a receiving controller, coupled to the key-table, configurable to receive an encrypted data from the sender,
        search the key-table for a decryption key corresponding to the encrypted data, enable a re-transmission mechanism of the sender when the decryption key is not stored in the key-table and the encrypted data is received successfully, update the decryption keys in the key-table with the decryption key corresponding to the encrypted data from a master key-table when the decryption key is not stored in the key-table; and
        decrypt the encrypted data according to the updated decryption key stored in the key-table.

17. The apparatus of claim 16 wherein the receiving controller discards the encrypted data when the decryption key is not stored in the key-table.

18. The apparatus of claim 16 wherein the receiving controller uses a Media Access Control (MAC) Address of the sender to search the key-table for the decryption key.

19. The apparatus of claim 16 wherein the receiving controller replaces a least frequently used decryption key in the key-list with the decryption key transferred in.

20. An apparatus for decrypting data received by a receiver, the receiver being in communication with a sender, comprising:
    a key-table for storing a plurality of decryption keys; and
    a receiving controller, coupled to the key-table, configurable to receive an encrypted data from the sender,
        search the key-table for a decryption key corresponding to the encrypted data, disable an acknowledgement message which informs the sender of reception of the encrypted data when the decryption key is not stored in the key-table and the encrypted data is received successfully,
        update the decryption keys in the key-table with the decryption key corresponding to the encrypted data from a master key-table when the decryption key is not stored in the key-table, and
        decrypt the encrypted data according to the updated decryption key stored in the key-table.

21. The apparatus of claim 20, wherein when the decryption key is not stored in the key-table and the encrypted data is received successfully, the receiving controller suspends the decrypt procedure until the re-transmitted encrypted data is received and the decryption key is updated.

* * * * *